(12) United States Patent
Kakui et al.

(10) Patent No.: US 7,170,674 B2
(45) Date of Patent: Jan. 30, 2007

(54) FLUORESCENCE GLASS, OPTICAL WAVE GUIDE FOR OPTICAL AMPLIFIER AND OPTICAL AMPLIFIER MODULE

(75) Inventors: Motoki Kakui, Yokohama (JP); Masayuki Shigematsu, Yokohama (JP); Shinji Ishikawa, Yokohama (JP); Ichiro Tsuchiya, Yokohama (JP); Takahiro Murata, Onojo (JP)

(73) Assignees: Sumitomo Electric Industries, Ltd., Osaka (JP); Kyushu University, Fukuoka (JP)

( * ) Notice: Subject to any disclaimer, the term of this patent is extended or adjusted under 35 U.S.C. 154(b) by 252 days.

(21) Appl. No.: 10/725,928

(22) Filed: Dec. 3, 2003

(65) Prior Publication Data

US 2004/0223211 A1 Nov. 11, 2004

(30) Foreign Application Priority Data

Dec. 6, 2002 (JP) ............................ 2002-355407
Sep. 30, 2003 (JP) ............................ 2003-340723

(51) Int. Cl.
H01S 3/067 (2006.01)
C03C 13/04 (2006.01)
C03C 3/076 (2006.01)

(52) U.S. Cl. .................... 359/341.5; 501/37; 501/55
(58) Field of Classification Search ............ 359/337.4, 359/341.5

See application file for complete search history.

(56) References Cited

U.S. PATENT DOCUMENTS

| | | | | |
|---|---|---|---|---|
| 3,785,834 A * | 1/1974 | Rapp | ............................. | 501/2 |
| 5,271,754 A * | 12/1993 | Bauerecker et al. | ......... | 65/17.3 |
| 6,235,667 B1 * | 5/2001 | Paloschi et al. | ............. | 501/72 |
| 6,396,623 B1 * | 5/2002 | Wysocki et al. | ......... | 359/337.4 |
| 6,410,467 B1 * | 6/2002 | Dickinson et al. | ............ | 501/37 |
| 6,465,381 B1 * | 10/2002 | Lautenschlager et al. | ..... | 501/67 |
| 6,599,852 B2 * | 7/2003 | Kondo et al. | .................. | 501/42 |
| 6,667,256 B2 * | 12/2003 | Masuko | ....................... | 501/32 |
| 6,764,746 B2 * | 7/2004 | Oobuchi et al. | ............ | 428/209 |
| 6,914,024 B2 * | 7/2005 | Anderson | ..................... | 501/33 |
| 6,936,556 B2 * | 8/2005 | Sridharan et al. | ............. | 501/14 |
| 2001/0044369 A1 * | 11/2001 | Sugimoto et al. | ............. | 501/50 |
| 2001/0046934 A1 * | 11/2001 | Naumann et al. | ............. | 501/64 |
| 2002/0038861 A1 * | 4/2002 | Toda et al. | ........... | 252/301.4 F |
| 2002/0041436 A1 * | 4/2002 | Kondo et al. | ............. | 359/341.5 |
| 2002/0071948 A1 * | 6/2002 | Duff et al. | .................. | 428/323 |

(Continued)

FOREIGN PATENT DOCUMENTS

WO WO00/23392 A1 * 4/2000

OTHER PUBLICATIONS

Fujimoto, Yasushi, et al. "New Fluorescence In 1.3 μ m Band from Bismuth-doped Silica Glass" Institute of Electronics, Information and Communications Engineers: Published Papers, C vol. J83-C, No. 4, pp. 354-355, Apr. 2000.

(Continued)

*Primary Examiner*—Jack Keith
*Assistant Examiner*—Ari M. Diacou
(74) *Attorney, Agent, or Firm*—McDermott Will & Emery LLP

(57) ABSTRACT

The present invention provides fluorescent glass containing at least 50 mol % of at least one kind of oxide selected from the group consisting of $SiO_2$, $GeO_2$, and $P_2O_5$ as a glass constituent of a region containing a Bi ion as a dopant.

17 Claims, 8 Drawing Sheets

U.S. PATENT DOCUMENTS

| | | | |
|---|---|---|---|
| 2002/0113241 A1* | 8/2002 | Kubota et al. | 257/79 |
| 2002/0163108 A1* | 11/2002 | Oshio et al. | 264/614 |
| 2003/0063892 A1 | 4/2003 | Beall et al. | |
| 2003/0064878 A1* | 4/2003 | Sugimoto et al. | 501/73 |
| 2005/0035331 A1* | 2/2005 | Sun | 252/301.5 |
| 2005/0064604 A1* | 3/2005 | Bohmann et al. | 436/525 |
| 2005/0092029 A1* | 5/2005 | Han et al. | 65/390 |
| 2005/0284184 A1* | 12/2005 | Baynham et al. | 65/391 |
| 2006/0128551 A1* | 6/2006 | Esmaeilzadeh | 501/55 |

OTHER PUBLICATIONS

Morinaga, Kenji, et al. "Compositional Dependence of Absorption Spectra of $Ti^{3+}$ In Silicate, Borate, and Phosphate Glasses." Journal of American Ceramic Society vol. 77, No. 12, Dec. 1994, pp. 92-96.

* cited by examiner

Fig.4

| OXIDE | B |
|---|---|
| $K_2O$ | 3.381 |
| $Na_2O$ | 2.349 |
| $Cu_2O$ | 2.326 |
| $Li_2O$ | 1.719 |
| BaO | 1.561 |
| PbO | 1.307 |
| SrO | 1.269 |
| CaO | 1.000 |
| SnO | 0.931 |
| FeO | 0.723 |
| ZnO | 0.723 |
| CuO | 0.703 |
| MgO | 0.641 |
| $Bi_2O_3$ | 0.512 |
| $Fe_2O_3$ | 0.282 |
| $Ga_2O_3$ | 0.269 |
| $Al_2O_3$ | 0.198 |
| $ZrO_2$ | 0.190 |
| $SnO_2$ | 0.148 |
| $TiO_2$ | 0.133 |
| $TeO_2$ | 0.078 |
| $GeO_2$ | 0.045 |
| $B_2O_3$ | 0.026 |
| $SiO_2$ | 0.000 |
| $P_2O_5$ | -0.103 |

| A | B | C | D | E | F | G | H | I |
|---|---|---|---|---|---|---|---|---|
| 0.01 | 0.01 | 0.01 | 0.30 | 0.16 | 0.14 | 0.30 | 0.41 | 0.21 |

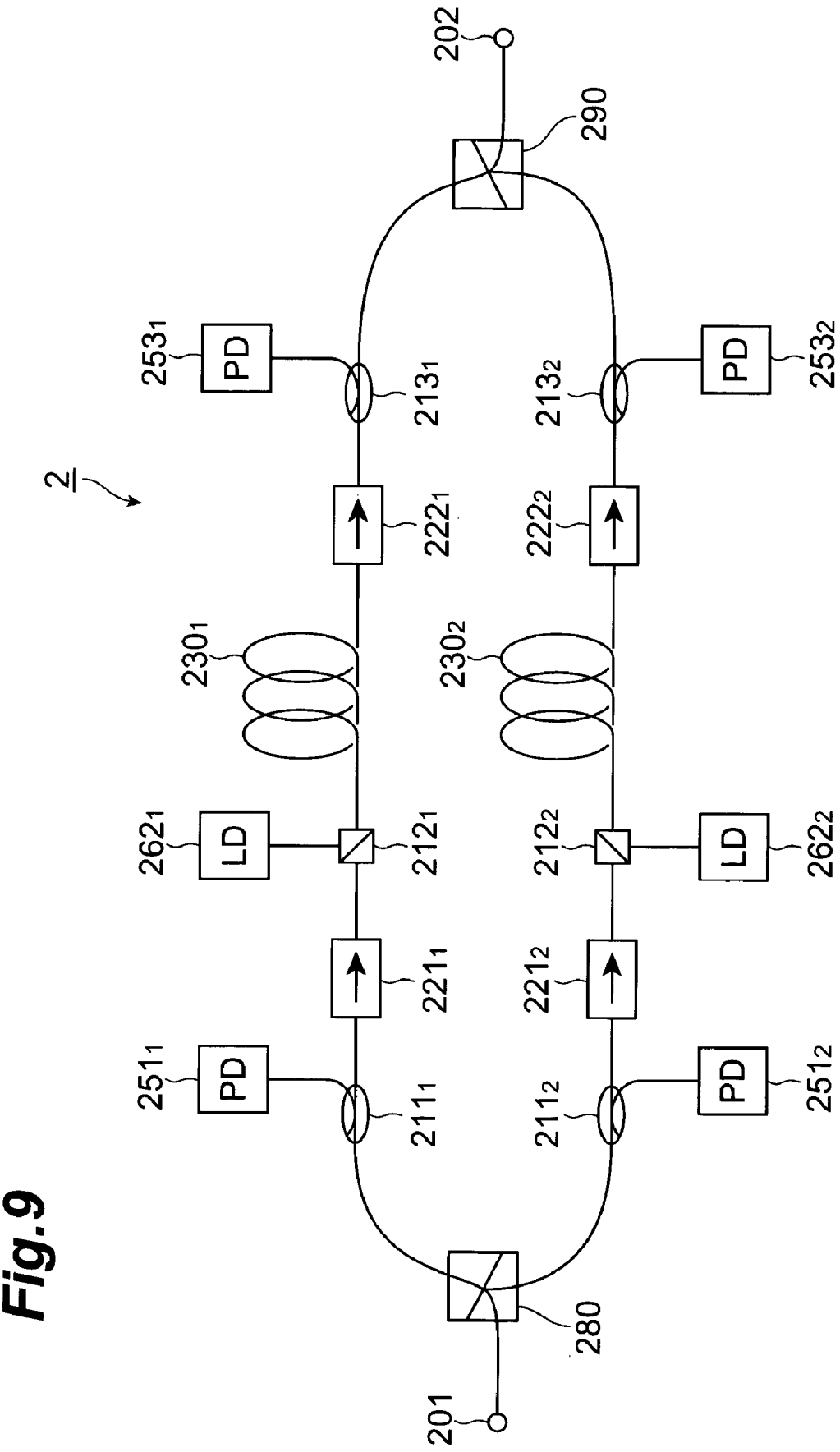

FLUORESCENCE GLASS, OPTICAL WAVE GUIDE FOR OPTICAL AMPLIFIER AND OPTICAL AMPLIFIER MODULE

BACKGROUND OF THE INVENTION

1. Field of the Invention

The present invention relates to fluorescent glass having a fluorescent property, an optical amplifier waveguide made of the fluorescent glass, and an optical amplifier module including the optical amplifier waveguide.

2. Related Background Art

Optical amplifier modules used in optical communication systems and the like compensate for the loss incurred in signal light during when the signal light propagates through optical transmission lines, and can optically amplify the signal light in optical amplifier fibers by supplying the optical amplification fibers with pumping light. For example, an optical amplifier module including an optical amplifier fiber doped with Er element (EDFA: Erbium-Doped Fiber Amplifier) can optically amplify signal light in C band (1530 nm to 1565 nm) or L band (1565 nm to 1625 nm) by using pumping light in the wavelength band of 0.98 μm or 1.48 μm. An optical amplifier module including an optical amplifier fiber doped with Tm element (TDFA: Thulium-Doped Fiber Amplifier) can optically amplify signal light in S band (1460 nm to 1530 nm) by using pumping light in the wavelength band of 0.8 μm, 1.05 μm, 1.2 μm, 1.4 μm, or 1.55 to 1.65 μm.

Fluorescent glass comprising a composition made of $Al_2O_3$ (3.7 wt %), $SiO_2$ (94.0 wt %), and $Bi_2O_3$ (2.2 wt %) has been disclosed in Yasushi Fujimoto et al., "New Emission Characteristics of Bi-Doped Silica Glass in the 1.3-μm Band", IEICE Trans. C., vol. J83-C, No. 4, pp. 354–355 (April 2000). The fluorescent glass comprising the composition containing $Bi_2O_3$ has a fluorescence spectrum over a wide band with a fluorescence peak wavelength near a wavelength of 1.24 μm. On the other hand, no absorption spectrum has been seen in this fluorescent glass within the wavelength range of 900 nm to 1600 nm. Therefore, an optical amplifier module constituted by an optical amplifier fiber made of this fluorescent glass is expected to optically amplify signal light in a band including a wavelength of 1.3 μm which is a zero-dispersion wavelength of typical single-mode optical fibers.

However, the fluorescence peak of the fluorescent glass disclosed in Non-patent Document 1 mentioned above exists near the wavelength of 1.24 μm shifted on the shorter wavelength side from the wavelength of 1.3 μm, whereby the efficiency of power conversion from pumping light to signal light in optical amplifier modules using optical amplifier fibers made of this fluorescent glass does not always seem to be favorable.

In the case of EDFA, its gain spectrum at the time of actual use is obtained when the absorption spectrum is subtracted from the fluorescence spectrum according to population inversion. Therefore, the gain peak wavelength does not always coincide with the fluorescence peak wavelength of 1.53 μm, but may rather exist near a wavelength of 1.55 μm to 1.56 μm on the longer wavelength side of the fluorescence peak wavelength. In the case of EDFA, the gain spectrum form is determined by population inversion, whereby a flatness can be realized in the gain spectrum when the population inversion is adjusted to 40% by regulating respective powers of pumping light and input signal light, for example. By contrast, the fluorescent glass disclosed in Non-patent Document 1 does not exhibit absorption but fluorescence, whereby the form of gain spectrum is considered to be identical to the form of fluorescence spectrum. Therefore, optical amplifier modules using optical amplifier fibers made of this fluorescent glass do not seem to attain a gain spectrum with a favorable flatness no matter how the respective powers of pumping light and signal light and the product of concentration and length of optical amplifier fibers are adjusted.

The fluorescent glass disclosed in Non-patent Document 1 has such a high melting point that it is made by heating to a temperature of 1760° C. Therefore, its manufacturing equipment becomes larger in scale, and the making is not always easy.

For overcoming the problems mentioned above, it is an object of the present invention to provide fluorescent glass, an optical amplifier waveguide, and an optical amplifier module which can realize a flat gain spectrum and are easy to make.

SUMMARY OF THE INVENTION

The present invention provides fluorescent glass containing at least 50 mol % of at least one kind of oxide selected from the group consisting of $SiO_2$, $GeO_2$, and $P_2O_5$ as a glass constituent of a region containing a Bi ion as a dopant. Such fluorescent glass exhibits a fluorescent property, and is easy to make since its melting point is low.

Preferably, the fluorescent glass in accordance with the present invention contains at least one kind of oxide selected from the group consisting of BaO, CaO, $Na_2O$, $B_2O_3$, $Ga_2O_3$, $Ta_2O_5$, and $Nb_2O_5$ as a glass constituent. This can realize a fluorescent characteristic corresponding to the composition.

Preferably, the fluorescent glass in accordance with the present invention contains an oxide of an element (e.g., Al or La) adapted to become a trivalent positive ion as a codopant. This can prevent Bi ions from clustering and enhance the fluorescence intensity. Preferably, the fluorescent glass contains $Al_2O_3$ as a codopant, whereas the concentration of $Al_2O_3$ is preferably at least 5 mol %.

Preferably, the fluorescent glass in accordance with the present invention contains $B_2O_3$ without containing $Al_2O_3$ as a codopant. This can realize a fluorescence peak in the wavelength band of 1.41 μm where the loss in optical fibers is low. Preferably, the fluorescent glass contains $Ta_2O_5$ as a codopant. This yields a fluorescence peak in the wavelength band of 1.32 μm more suitable for optical communications.

Preferably, the fluorescent glass in accordance with the present invention exhibits a fluorescence peak wavelength exceeding 1300 nm. In this case, optical waveguides (e.g., optical fibers) made of the fluorescent glass can optically amplify signal light used in optical communication systems. More preferably, the fluorescence peak wavelength exceeds 1400 nm. In this case, optical waveguides (e.g., optical fibers) made of the fluorescent glass can optically amplify signal light propagating in optical communication systems with a low loss.

Preferably, the fluorescent glass in accordance with the present invention exhibits a B value of 0.3 or less as an index of alkalinity. This can enhance the fluorescence intensity. Preferably, the fluorescent glass contains an oxide of an element adapted to become a trivalent positive ion as a codopant. This can prevent Bi ions from clustering and enhance the fluorescence intensity.

The present invention provides a fluorescent crystal containing a codopant other than $Al_2O_3$ in a region containing a Bi ion as a dopant. The present invention provides a fluorescent glass ceramic containing a codopant other than $Al_2O_3$ in a region containing a Bi ion as a dopant. Each of the fluorescent glass crystal and ceramic can yield fluorescence stronger than that of the fluorescent glass.

The present invention provides an optical amplifier waveguide comprising the fluorescent glass in accordance with the present invention; the optical amplifier waveguide being adapted to guide pumping light and signal light, and optically amplify the signal light when supplied with the pumping light. The present invention provides an optical amplifier module comprising the optical amplifier waveguide in accordance with the present invention, and pumping light supply means for supplying the amplifier waveguide with the pumping light. In this optical amplifier module, the optical amplifier waveguide acting as an optical amplifier medium comprises the fluorescent glass in accordance with the present invention, the pumping light supply means supplies the optical amplifier waveguide with the pumping light, and the signal light is optically amplified in the optical amplifier waveguide. Therefore, the optical amplifier module can attain a gain in a wavelength region which has conventionally failed to yield a gain. Preferably, the pumping light has a center wavelength longer than 800 nm. This can make the fluorescence peak wavelength longer than 1.3 μm.

The present invention provides an optical amplifier module comprising (1) first and second optical amplifier waveguides, cascaded to each other on a signal light propagation line, having respective compositions different from each other, each being an optical amplifier waveguide in accordance with the present invention; (2) first pumping light supply means for supplying the first optical amplifier waveguide with pumping light; and (3) second pumping light supply means for supplying the second optical amplifier waveguide with pumping light. Preferably, the first optical amplifier waveguide contains $Al_2O_3$, the second optical amplifier waveguide contains a codopant other than $Al_2O_3$, and the first and second optical amplifier waveguides have respective fluorescence peak wavelengths separated from each other by at least 70 nm. In this optical amplifier module, signal light is optically amplified by each of the first and second optical amplifier waveguides cascaded to each other on the signal light propagation line. Since the first and second optical amplifier waveguides have respective compositions different from each other while each being an optical amplifier waveguide in accordance with the present invention, the optical amplifier module can attain a gain over a wide band.

The present invention provides an optical amplifier module comprising (1) first and second optical amplifier waveguides having respective compositions different from each other, each being an optical amplifier waveguide in accordance with the present invention; (2) first pumping light supply means for supplying the first optical amplifier waveguide with pumping light; (3) second pumping light supply means for supplying the second optical amplifier waveguide with pumping light; (4) optical dividing means for dividing input signal light into first and second wavelength regions, outputting the first wavelength region of signal light to the first optical amplifier waveguide, and outputting the second wavelength region of signal light to the second optical amplifier waveguide; and (5) optical combining means for combining the first wavelength region of signal light outputted from the first optical amplifier waveguide after being optically amplified thereby and the second waveguide of signal light outputted from the second optical amplifier waveguide after being optically amplified thereby, and outputting thus combined signal light. In this optical amplifier module, the input signal light is divided by the optical dividing means into first and second wavelength regions. The first and second optical amplifier waveguides are connected in parallel between the optical dividing means and optical combining means. The first wavelength region of signal light is optically amplified by the first optical amplifier waveguide, the second wavelength region of signal light is optically amplified by the second optical amplifier waveguide, the optically amplified first and second wavelength regions of signal light are combined by the optical combining means, and thus combined signal light is outputted from the optical combining means. Since the first and second optical amplifier waveguides have respective compositions different from each other while each being an optical amplifier waveguide in accordance with the present invention, the optical amplifier module can attain a gain over a wide band.

BRIEF DESCRIPTION OF THE DRAWINGS

FIG. 4 is a chart listing B values of typical oxides;

FIG. 9 is a diagram showing an optical amplifier module 2 in accordance with a second embodiment of the present invention.

DESCRIPTION OF THE PREFERRED EMBODIMENTS

In the following, best modes for carrying out the invention will be explained in detail with reference to the accompanying drawings. In the explanation of the drawings, constituents identical to each other will be referred to with numerals identical to each other without repeating their overlapping descriptions.

The fluorescent glass in accordance with an embodiment of the present invention contains at least 50 mol % of at least one kind of oxide selected from the group consisting of $SiO_2$, $GeO_2$, and $P_2O_5$ as a glass constituent of a region containing a Bi ion as a dopant. Preferably, this fluorescent glass contains at least one kind of oxide selected from the group consisting of BaO, CaO, $Na_2O$, $B_2O_3$, $Ga_2O_3$, $Ta_2O_5$, and $Nb_2O_5$ as a glass constituent. Preferably, the fluorescent glass contains an oxide of an element adapted to become a trivalent positive ion as a codopant. In particular, it is preferred that the fluorescent glass contain $Al_2O_3$ as a codopant, and that the concentration of $Al_2O_3$ be at least 5 mol %. It will also be preferred if the fluorescent glass contains $B_2O_3$ without containing $Al_2O_3$ as a codopant. Preferably, the fluorescent glass contains $Ta_2O_5$. The fluorescence peak wavelength preferably exceeds 1300 nm, more preferably 1400 nm. Preferably, the fluorescent glass exhibits a B value of 0.3 as an index of alkalinity. Preferably, the fluorescent glass contains an oxide of an element adapted to become a trivalent positive ion as a codopant.

Figure 1:
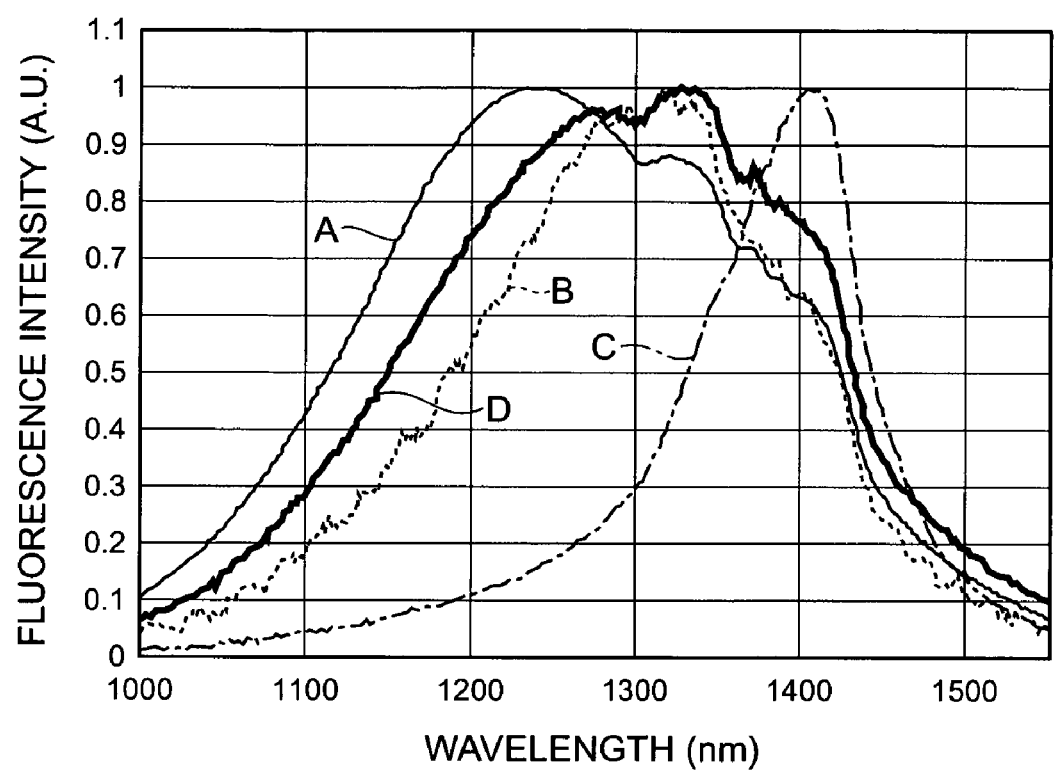
FIG. 1 is a graph showing fluorescent characteristics of fluorescent glass samples in accordance with an embodiment.

FIG. 1 is a graph showing respective fluorescent characteristics of fluorescent glass samples in accordance with this embodiment. This graph shows the respective fluorescent characteristics of four kinds of fluorescent glass samples A to D. The fluorescent glass sample A has a composition made of $Al_2O_3$ (2.2 mol %), $SiO_2$ (97.5 mol %), and $Bi_2O_3$ (0.3 mol %). The fluorescent glass sample B has a composition made of $Ta_2O_5$ (2.5 mol %), $B_2O_3$ (5 mol %), $Sio_2$ (92.5 mol %), and $Bi_2O_3$ (0.3 mol %). The fluorescent glass sample C has a composition made of $GeO_2$ (2.5 mol %), $B_2O_3$ (5 mol %), $SiO_2$ (92.5 mol %), and $Bi_2O_3$ (0.3 mol %). The fluorescent glass sample D has a composition made of $Na_2O$ (5 mol %), $Al_2O_3$ (5 mol %), $GeO_2$ (90 mol %), and $Bi_2O_3$ (0.8 mol %). The composition of each of the fluorescent glass samples B to D is expressed from the viewpoint of with how much $Bi_2O_3$ the matrix composition is doped. Laser light having a wavelength of 800 nm outputted from a Ti sapphire laser light source was used as pumping light.

As can be seen from this graph, the fluorescent glass sample A has a fluorescence peak near a wavelength of 1.24 µm. By contrast, each of the fluorescent glass samples B and D has a fluorescence peak near a wavelength of 1.32 µm and thus is suitable for optically amplifying signal light in O band (1260 nm to 1360 nm). The fluorescent glass sample C has a fluorescence peak near a wavelength of 1.41 µm and thus is suitable for optically amplifying signal light in E band (1360 nm to 1460 nm).

Though the host glass in each of the fluorescent glass samples A to D is $SiO_2$, fluorescent characteristics similar to those shown in FIG. 1 are also obtained when the host glass is $GeO_2$ or $P_2O_5$. While the melting point of $SiO_2$ host glass ranges from 1500° C. to 1600° C., each of $GeO_2$ host glass and $P_2O_5$ host glass has a melting point within the range of 1350° C. to 1400° C. and thus is advantageous in that they can be made by relatively simple means such as a crucible method.

Figure 2:
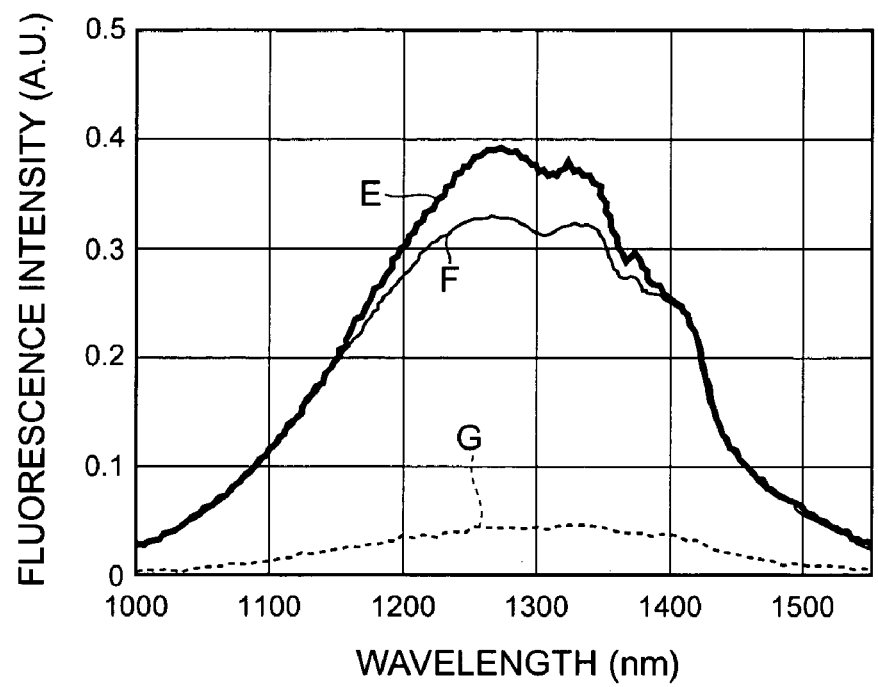
FIG. 2 is a graph showing fluorescent characteristics of fluorescent glass samples in accordance with another embodiment.

FIG. 2 is a graph showing respective fluorescent characteristics of fluorescent glass samples in accordance with another embodiment. This graph shows the respective fluorescent characteristics of three kinds of fluorescent glass samples E to G. The host glass in each of the fluorescent glass samples E to G is $GeO_2$. The fluorescent glass sample E has a composition made of BaO (5 mol %), $Al_2O_3$ (5 mol %), $GeO_2$ (90 mol %), and $Bi_2O_3$ (0.8 mol %). The fluorescent glass sample F has a composition made of CaO (5 mol %), $Al_2O_3$ (5 mol %), $GeO_2$ (90 mol %), and $Bi_2O_3$ (0.8 mol %). The fluorescent glass sample G has a composition made of $Na_2O$ (5 mol %), $Al_2O_3$ (5 mol %), $GeO_2$ (90 mol %), and $Bi_2O_3$ (0.8 mol %). The composition of each of the fluorescent glass samples is expressed from the viewpoint of with how much $Bi_2O_3$ the matrix composition is doped here as well. Laser light having a wavelength of 800 nm outputted from a Ti sapphire laser light source was used as pumping light.

Since the absorption spectrum of Bi-doped fluorescent glass has respective remarkable peaks at wavelengths of 500 nm and 700 nm, the pumping light wavelength of 800 nm seems to be too long. However, when the fluorescent glass is pumped with pumping light having a shorter wavelength, the fluorescence peak shifts to the shorter wavelength side than the wavelength band of 1.26 µm. Therefore, it will be preferred if the Bi-doped fluorescent glass is pumped with pumping light having a wavelength of 800 nm or longer although its absorption efficiency is lower.

Figure 3:
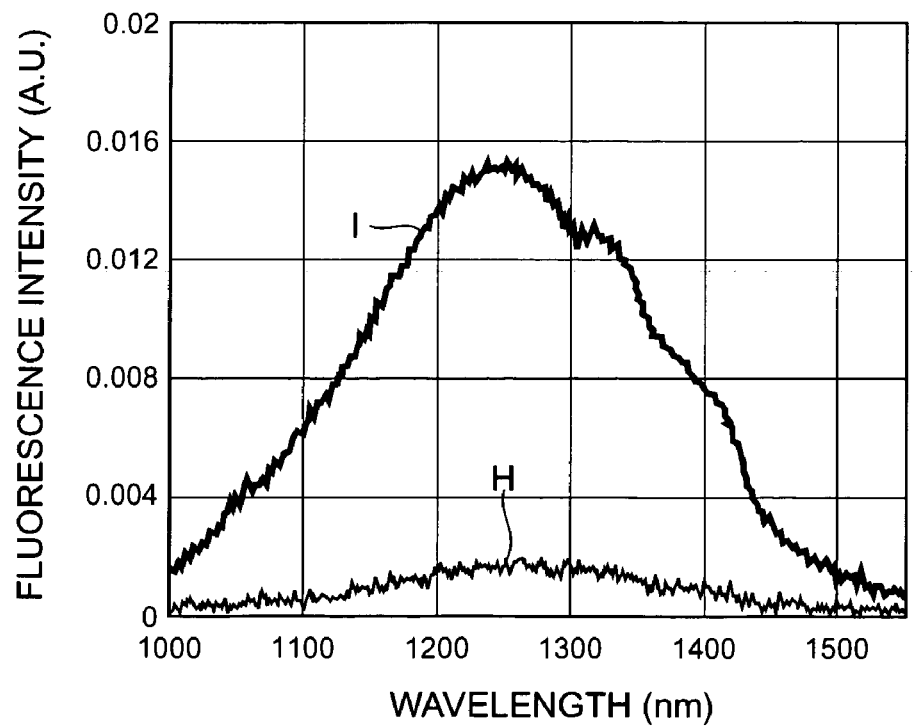
FIG. 3 is a graph showing fluorescent characteristics of fluorescent glass samples in accordance with still another embodiment.

FIG. 3 is a graph showing fluorescent characteristics of fluorescent glass samples in accordance with another embodiment. This graph shows respective fluorescent characteristics of two kinds of fluorescent glass samples H and I. The host glass of each of the fluorescent glass samples H and I is $P_2O_5$. The fluorescent glass sample H has a composition made of BaO (50 mol %), $P_2O_5$ (50 mol %), and $Bi_2O_3$ (0.8 mol %). The fluorescent glass sample I has a composition made of BaO (30 mol %), $Al_2O_3$ (10 mol %), $P_2O_5$ (60 mol %), and $Bi_2O_3$ (0.8 mol %). The composition of each of the fluorescent glass samples is expressed from the viewpoint of with how much $Bi_2O_3$ the matrix composition is doped here as well. Laser light having a wavelength of 800 nm outputted from a Ti sapphire laser light source was used as pumping light.

As can be seen from FIGS. 2 and 3, the fluorescent glass sample E has a fluorescence peak near a wavelength of 1.26 µm which is somewhat longer than the fluorescence peak wavelength of the fluorescent glass sample A. The fluorescent glass sample I has a fluorescence peak near a wavelength of 1.25 µm which is somewhat longer than the fluorescence peak wavelength of the fluorescent glass sample A. When the host glass is $GeO_2$, it preferably contains BaO as a dopant. When the host glass is $P_2O_5$, it preferably contains BaO as a dopant. If the glass further contains $Al_2O_3$, it will be more effective in enhancing the fluorescence.

One of reasons why the fluorescence intensity of the fluorescent glass sample I is greater than that of the fluorescent glass H seems to be because added $Al_2O_3$ prevents Bi ions from clustering, thereby contributing to enhancing the fluorescence intensity. Similar effects seem to be obtained not only when copoded with $Al_2O_3$ but also when codoped with oxides of elements (e.g., La) adapted to become a trivalent positive ion as with Bi. The codopant concentration of these oxides is desired to be high, and is preferably at least 5 mol % as in the fluorescent glass sample J shown in FIG. 5 which will be explained later.

When a mechanism by which fluorescence occurs in Bi ions is considered, fluorescence is presumed to occur because of changes in the oxygen coordination number. This is more likely to occur when the oxygen coordination number of Bi ions is 12, which is a high state. For realizing this state, it will be sufficient if the oxygen supplying capacity of glass is lowered. As an index therefor, the B value, which is a parameter indicative of the alkalinity of oxide glass, is used.

The B value is defined as follows: A parameter $A_i$ indicative of the binding force between a positive ion and an oxygen ion caused by the coulomb force of a glass constituent i is represented by the following expression:

$$A_i = \frac{Z_i \times 2}{(r_i + 1.40)^2} \quad (1)$$

where $Z_i$ is the atomic value of the positive ion, $r_i$ is the radius of the positive value, the value of 2 is the atomic value of the oxygen ion, and the value of 1.40 is the radius of the oxygen ion.

$B_i'$ which is the reciprocal of $A_i$ indicates the activity (alkalinity) of oxygen ion in the glass constituent i in the glass system as follows:

$$B_i' = \frac{1}{A_i} \quad (2)$$

A parameter $B_i$ which standardizes $B_i'$ is represented by the following expression:

$$B_i = \frac{B_i' - B_{SiO_2}'}{B_{CaO}' - B_{SiO_2}'} = \frac{B_i' - 0.405}{1.023} \quad (3)$$

where $B'_{SiO_2}$ is the $B_i'$ value of the $SiO_2$ component, and $B'_{CaO}$ is the $B_i'$ value of the CaO component. Thus standardized $B_i$ attains a value of 0 with respect to the $SiO_2$ component, and a value of 1 with respect to the CaO component.

In the case of multicomponent glass, a parameter B is represented by the following expression:

$$B = \sum_i n_i B_i \quad (4)$$

where $n_i$ is the ratio of positive ions in the glass constituent i.

FIG. 4 is a chart listing respective B values of typical oxides. For example, the following fluorescent glass samples J and K are considered. The fluorescent glass J has a composition made of $Al_2O_3$ (5 mol %), $B_2O_3$ (15 mol %), $SiO_2$ (80 mol %), and $Bi_2O_3$ (0.8 mol %). The fluorescent glass K has a composition made of $Na_2O$ (40 mol %), $Al_2O_3$ (5 mol %), $SiO_2$ (55 mol %), and $Bi_2O_3$ (0.8 mol %). The Al concentration of the fluorescent glass sample J is the same as that of the fluorescent glass sample K. When calculated according to the B values of the oxides listed in FIG. 4 and the above-mentioned expression (4), the B values of the fluorescent glass samples J and K are 0.03 and 1.31, respectively.

Figures 5, 6:
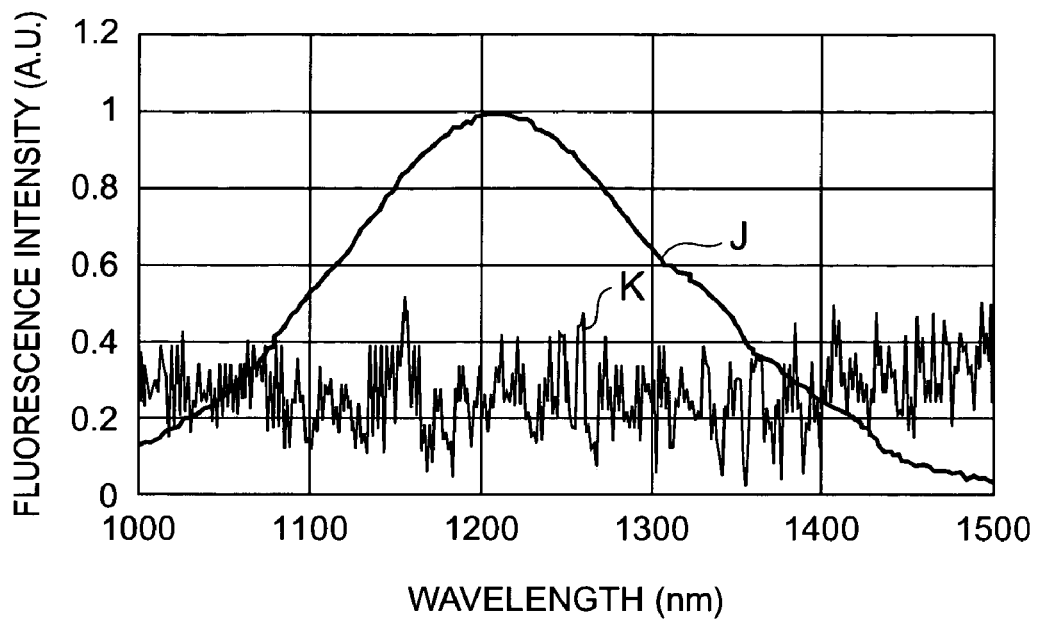
FIG. 5 is a graph showing respective fluorescent characteristics of fluorescent glass samples J and K.
FIG. 6 is a chart listing B values of fluorescent glass samples A to I.

FIG. 5 is a graph showing respective fluorescent characteristics of the fluorescent glass samples J and K. The fluorescent characteristic of the fluorescent glass sample K was measured with its measurement range magnified until some emission could be observed. The fluorescent glass sample J having a low B value exhibited remarkable fluorescence as with the samples shown in FIGS. 1 to 3. By contrast, only noise components were observed in the fluorescent glass sample K with a large B value even when the measurement range was magnified FIG. 6 is a chart listing respective B values of fluorescent glass samples A to I. The respective B values of fluorescent glass samples A to I were determined according to the respective B values of oxides listed in FIG. 4 and the above-mentioned expression (4). The B value of the fluorescent glass sample G with a low fluorescence intensity in FIG. 2 is 0.30, and that of the fluorescent glass sample H with a high fluorescence intensity in FIG. 3 is 0.41, both being greater than those of the other fluorescent glass samples. The fluorescence intensity of the fluorescent glass samples E, F is several times as high as that of the fluorescent glass sample G, which seems to result from the fact that the fluorescent glass samples E, F have low B values. The fluorescence intensity of the fluorescent glass sample I is several times as high as that of the fluorescent glass sample H, which seems to result from both of the facts that the B value of the fluorescent glass sample I is small and that the fluorescent glass sample I is doped with Al.

For attaining fluorescence of Bi ions, in view of the foregoing, it is desirable that fluorescent glass keep its B value at 0.3 or less while being codoped with an oxide of an element, such as Al, adapted to become a trivalent positive ion.

Optical amplifier modules in accordance with embodiments will now be explained. These optical amplifier modules employ optical amplifier fibers (optical amplifier waveguides) made of the fluorescent glass in accordance with the above-mentioned embodiment.

Figure 7:
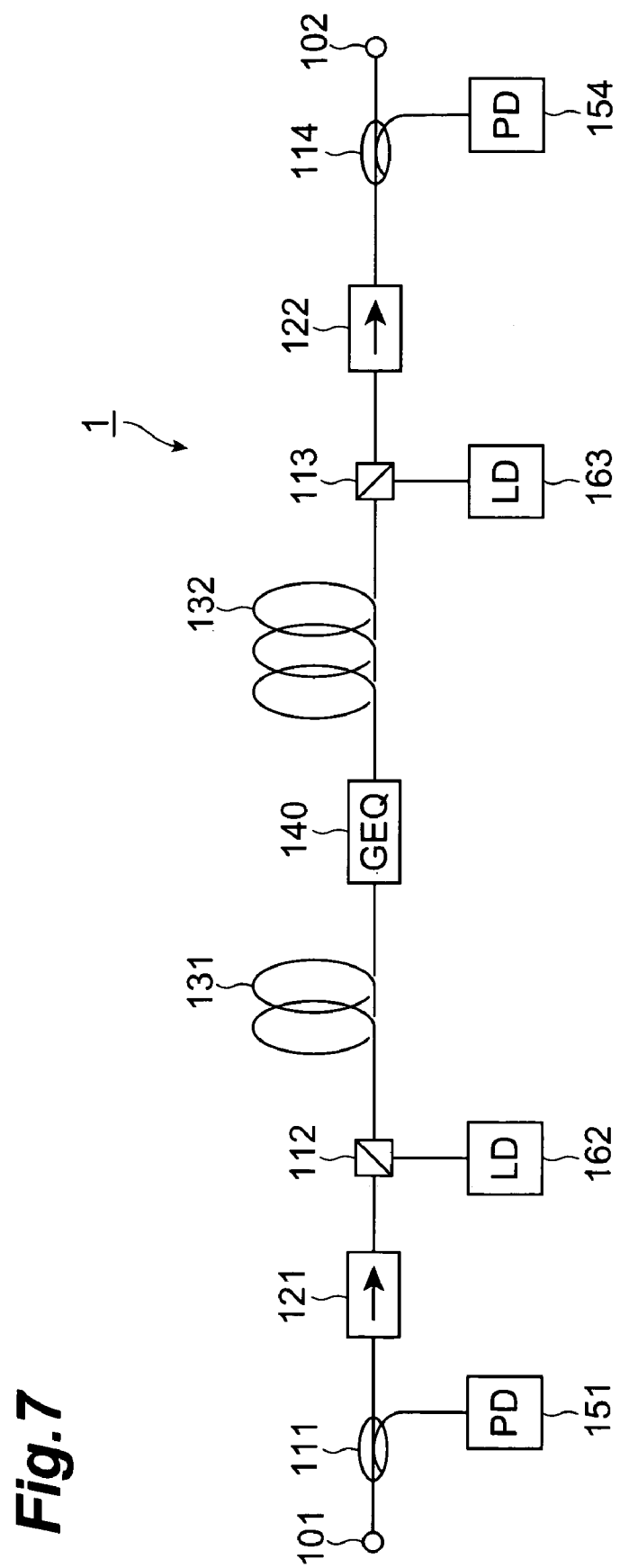
FIG. 7 is a diagram showing an optical amplifier module 1 in accordance with a first embodiment of the present invention.

FIG. 7 is a diagram of the optical amplifier module 1 in accordance with a first embodiment. The optical amplifier module 1 shown in this drawing optically amplifies signal light fed to an optical input end 101, and outputs thus amplified signal light from an optical output end 102. The optical amplifier module 1 comprises, successively on a signal light propagation line from the optical input end 101 to the optical output end 102, an optical coupler 111, an optical isolator 121, an optical coupler 112, an optical amplifier fiber 131, a gain equalizer 140, an optical amplifier fiber 132, an optical coupler 113, an optical isolator 122, and an optical coupler 114. The optical amplifier module 1 further comprises a photodiode 151 connected to the optical coupler 111, a laser diode 162 connected to the optical coupler 112, a laser diode 163 connected to the optical coupler 113, and a photodiode 154 connected to the optical coupler 114.

The optical amplifier fibers 131, 132 comprise any of the above-mentioned fluorescent glass samples, and can guide pumping light and signal light while being able to optically amplify the signal light when supplied with the pumping light. The optical amplifier fibers 131, 132 have respective compositions different from each other and are cascaded to each other on the signal light propagation line. Each of the optical isolators 121, 122 transmits therethrough light in a forward direction from the optical input end 101 to the optical output end 102 but not in the backward direction. The optical coupler 112 and laser diode 162 constitute pumping light supply means for supplying the optical amplifier fiber 132 with the pumping light. The gain equalizer 140 has a loss spectrum in a form substantially identical to respective forms of gain spectra of the optical amplifier fibers 131, 132 in their gain bands, so as to equalize the gain.

In the optical amplifier module 1, the pumping light outputted from the laser diode 162 acting as a pumping light source is forwardly supplied to the optical amplifier fiber 131 by way of the optical coupler 112. The pumping light outputted from the laser diode 163 acting as a pumping light source is backwardly supplied to the optical amplifier fiber 132 by way of the optical coupler 113. The signal light fed to the optical input end 101 enters the optical amplifier fiber 131 by way of the optical coupler 111, optical isolator 121, and optical coupler 112, and is optically amplified in the optical amplifier fiber 131. The signal light optically amplified in the optical amplifier fiber 131 incurs a loss corresponding to its wavelength in the gain equalizer 140, and then enters the optical amplifier fiber 132, so as to be optically amplified therein. The signal light optically amplified in the optical amplifier fiber 132 is outputted from the optical output end 102 by way of the optical coupler 113, optical isolator 122, and optical coupler 114. Part of the signal light fed to the optical input end 101 is branched out by the optical coupler 111, and the power thereof is monitored by the photodiode 151. Part of the signal light outputted from the optical output end 102 is branched out by the optical coupler 114, and the power thereof is monitored by the photodiode 154.

The overall gain spectrum of the optical amplifier module 1 is the sum of the respective gain spectra of the optical amplifier fibers 131, 132 and the loss spectrum of the gain equalizer 140. The optical amplifier module 1 can attain a gain over a wide band as a whole, since the optical amplifier fibers 131, 132 comprise respective fluorescent glass compositions different from each other and have respective gain bands different from each other.

Figure 8A:
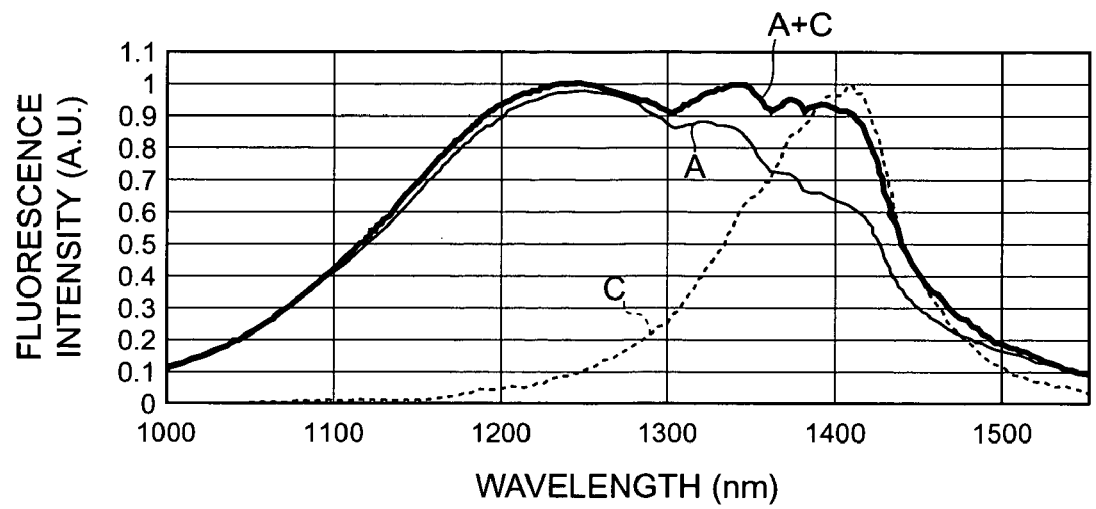
FIGS. 8A and 8B are charts showing gain spectra of the optical amplifier module 1 in accordance with the first embodiment of the present invention.
Figure 8B:
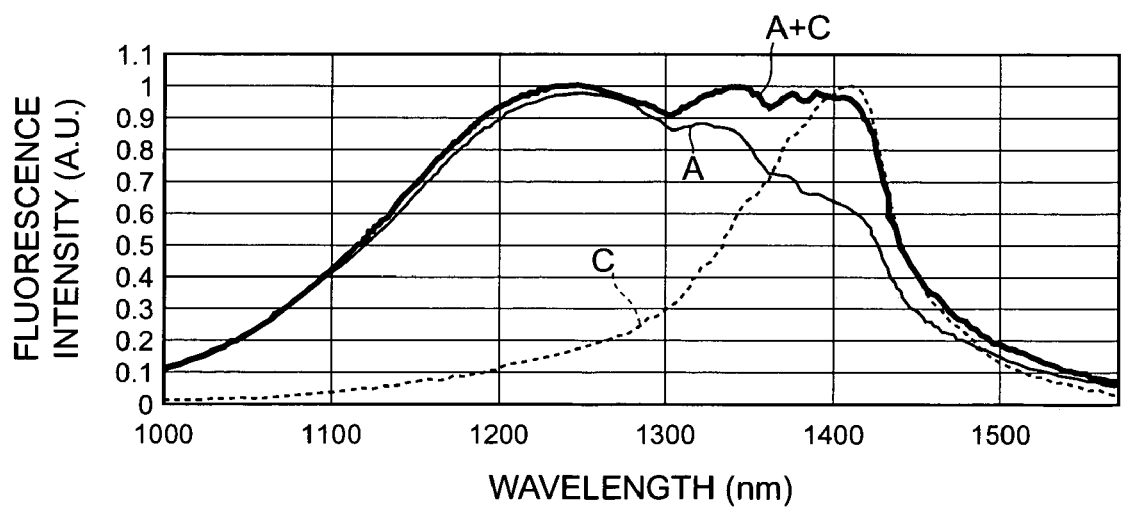

FIGS. 8A and 8B are graphs showing gain spectra of the optical amplifier module 1 in accordance with the first embodiment. Since the fluorescence intensity in a linear scale of an optical amplifier fiber is proportional to the gain in a dB scale, these graphs can be considered to represent gain spectra in a dB scale. Here, it is assumed that the optical amplifier fiber 131 is made of the fluorescent glass sample A, and that the optical amplifier fiber 132 is made of the fluorescent glass sample C. It is also assumed that the pumping light supplied from the laser diodes 162, 163 to the optical amplifier fibers 131, 132 has a wavelength of 800 nm. The gain spectrum of the optical amplifier fiber 131 made of the fluorescent glass sample A has a gain band ranging from 1175 nm to 1340 nm with a bandwidth of 165 nm in which the gain is at least 85% of a gain peak. By contrast, the total gain spectrum of the optical amplifier fibers 131 and 132 cascaded to each other has a gain band ranging from 1180 nm to 1420 nm in which the gain is at least 85% of a gain peak, whereby the bandwidth is expanded to 240 nm. The gain band is expanded not on the short wavelength side but by about 70 nm into E band where the loss of optical fibers used as an optical transmission line is lower, which is favorable when applied to signal light transmissions.

From the viewpoint of noise characteristics, it will be preferred if the optical amplifier fiber 131 on the upstream side has a gain higher than that of the optical amplifier fiber 132 on the downstream side. Therefore, it is preferred that the optical amplifier fiber 131 on the upstream side comprise the fluorescent glass sample A having a relatively high gain and that the optical amplifier fiber 132 on the downstream side comprise the fluorescent glass sample C having a relatively low gain.

In the optical amplifier module 1 in accordance with the first embodiment, the laser diodes 162, 163 for supplying the optical amplifier fibers 131, 132 with the pumping light may be those with an output wavelength of 800 nm which are easily available, or those adapted to output laser light in the band of 500 nm or 700 nm where an absorption peak peculiar to Bi fluorescent glass exists.

FIG. 9 is a diagram showing an optical amplifier module 2 in accordance with a second embodiment. The optical amplifier module 2 shown in this drawing comprises two signal light propagation lines disposed in parallel between an optical demultiplexer 280 on the optical input end 201 side and an optical multiplexer 290 on the optical output end 202 side. The optical amplifier module 2 comprises, successively on the first signal light propagation line from the optical demultiplexer 280 to the optical multiplexer 290, an optical coupler $211_1$, an optical isolator $221_1$, an optical coupler $212_1$, an optical amplifier fiber $230_1$, an optical isolator $222_1$, and an optical coupler $213_1$. The optical amplifier 2 also comprises, successively on the second signal light propagation line from the optical demultiplexer 280 to the optical multiplexer 290, an optical coupler $211_2$, an optical isolator $221_2$, an optical coupler $212_2$, an optical amplifier fiber $230_2$, an optical isolator $222_2$, and an optical coupler $213_2$. The optical amplifier module 2 further comprises a photodiode $251_1$, connected to the optical coupler $211_1$, a laser diode $262_1$, connected to the optical coupler $212_1$, a photodiode $253_1$, connected to optical coupler $213_1$, a photodiode $251_2$ connected to the optical coupler $211_2$, a laser diode $262_2$ connected to the optical coupler $212_2$, and a photodiode $253_2$ connected to optical coupler $213_2$.

The optical demultiplexer 280 divides the signal light fed to the optical input end 201 into first and second wavelength regions, outputs the first wavelength region of signal light to the optical coupler $211_1$, on the first signal light propagation line, and outputs the second wavelength region of signal light to the optical coupler $211_2$ on the second signal light propagation line. The optical multiplexer 290 inputs the first wavelength region of signal light having arrived from the optical coupler $213_1$, on the first signal light propagation line and the second wavelength region of signal light having arrived from the optical coupler $213_2$ on the second signal light propagation line, combines them, and outputs thus combined signal light from the optical output end 202. The other constituents included in the optical module 2 in accordance with the second embodiment have functions similar to those of the constituents having the same names included in the optical module 1 in accordance with the first embodiment. The optical amplifier fibers $230_1$, $230_2$ are made of any of the above-mentioned fluorescent glass samples, and can guide pumping light and signal light while being able to optically amplify the signal light when supplied with the pumping light. The optical amplifier fibers $230_1$, $230_2$ have respective compositions different from each other and are optically connected in parallel between the optical demultiplexer 280 and optical multiplexer 290. The optical amplifier fiber $230_1$, has a gain greater in the first wavelength region, whereas the optical amplifier fiber $230_2$ has a gain greater in the second wavelength region.

In this optical amplifier module 2, the pumping light outputted from the laser diode $262_1$, acting as a pumping light source is forwardly supplied to the optical amplifier fiber $230_1$, by way of the optical coupler $212_1$. The pumping light outputted from the laser diode $262_2$ acting as a pumping light source is forwardly supplied to the optical amplifier fiber $230_2$ by way of the optical coupler $212_2$. The signal light fed to the optical input end 201 is demultiplexed into first and second wavelength regions by the optical demultiplexer 280, the first wavelength region of signal light is outputted to the optical coupler $211_1$, on the first signal light line, and the second wavelength region of signal light is outputted to the optical coupler $211_2$ on the second signal light line.

The first wavelength region of signal light outputted from the optical demultiplexer 280 to the optical coupler $211_1$, on the first signal light line travels the optical coupler $211_1$, optical isolator $221_1$, and optical coupler $212_1$, and then is optically amplified in the optical amplifier fiber $230_1$. Thus optically amplified signal light reaches the optical multiplexer 290 by way of the optical isolator $222_1$, and optical coupler $213_1$. The second wavelength region of signal light outputted from the optical demultiplexer 280 to the optical coupler $211_2$ on the second signal light line travels the optical coupler $211_2$, optical isolator $221_2$, and optical coupler $212_2$, and then is optically amplified in the optical amplifier fiber $230_2$. Thus optically amplified signal light reaches the optical multiplexer 290 by way of the optical isolator $222_2$ and optical coupler $213_2$. The first wavelength region of signal light having reached the optical multiplexer 290 from the optical coupler $213_1$, on the first signal light propagation line and the second wavelength region of signal light having reached the optical multiplexer 290 from the optical coupler $213_2$ on the second signal light propagation line are combined by the optical multiplexer 290, and thus combined signal light is outputted from the optical output end 202.

Part of the first wavelength region of signal light fed to the optical input end 201 is branched out by the optical coupler $211_1$, and the power thereof is monitored by the photodiode $251_1$. Part of the second wavelength region of signal light fed to the optical input end 201 is branched out by the optical coupler $211_2$, and the power thereof is monitored by the photodiode $251_2$. Part of the first wavelength region of signal light outputted from the optical output end 202 is branched out by the optical coupler $213_1$, and the power thereof is monitored by the photodiode $253_1$. Part of the second wavelength region of signal light outputted from the optical output end 202 is branched out by the optical coupler $213_2$, and the power thereof is monitored by the photodiode $253_2$.

The overall gain spectrum of the optical amplifier module 2 is similar to that of the optical amplifier fiber $230_1$, in the first wavelength region, and that of the optical amplifier fiber $230_2$ in the second wavelength region. The optical amplifier fibers $230_1$, $230_2$ comprise respective fluorescent glass compositions different from each other and have respective gain bands different from each other, whereby the optical amplifier module 2 can attain a gain over a wide band as a whole.

For example, it is assumed that the optical amplifier fiber $230_1$, is made of the fluorescent glass sample A having a fluorescence peak near a wavelength of 1.24 μm, and that the optical amplifier fiber $230_2$ is made of the fluorescent glass sample C having a fluorescence peak near a wavelength of 1.41 μm. The optical demultiplexer 280 is assumed to divide signal light into a first wavelength region including the wavelength of 1.24 μm, and a second wavelength region including the wavelength of 1.41 μm. The optical multiplexer 290 is assumed to combine the first and second wavelength regions mentioned above. In this case, the optical amplifier module 2 can attain a gain spectrum having a bandwidth on a par with that of the optical amplifier module 1 in accordance with the first embodiment.

Figure 10:
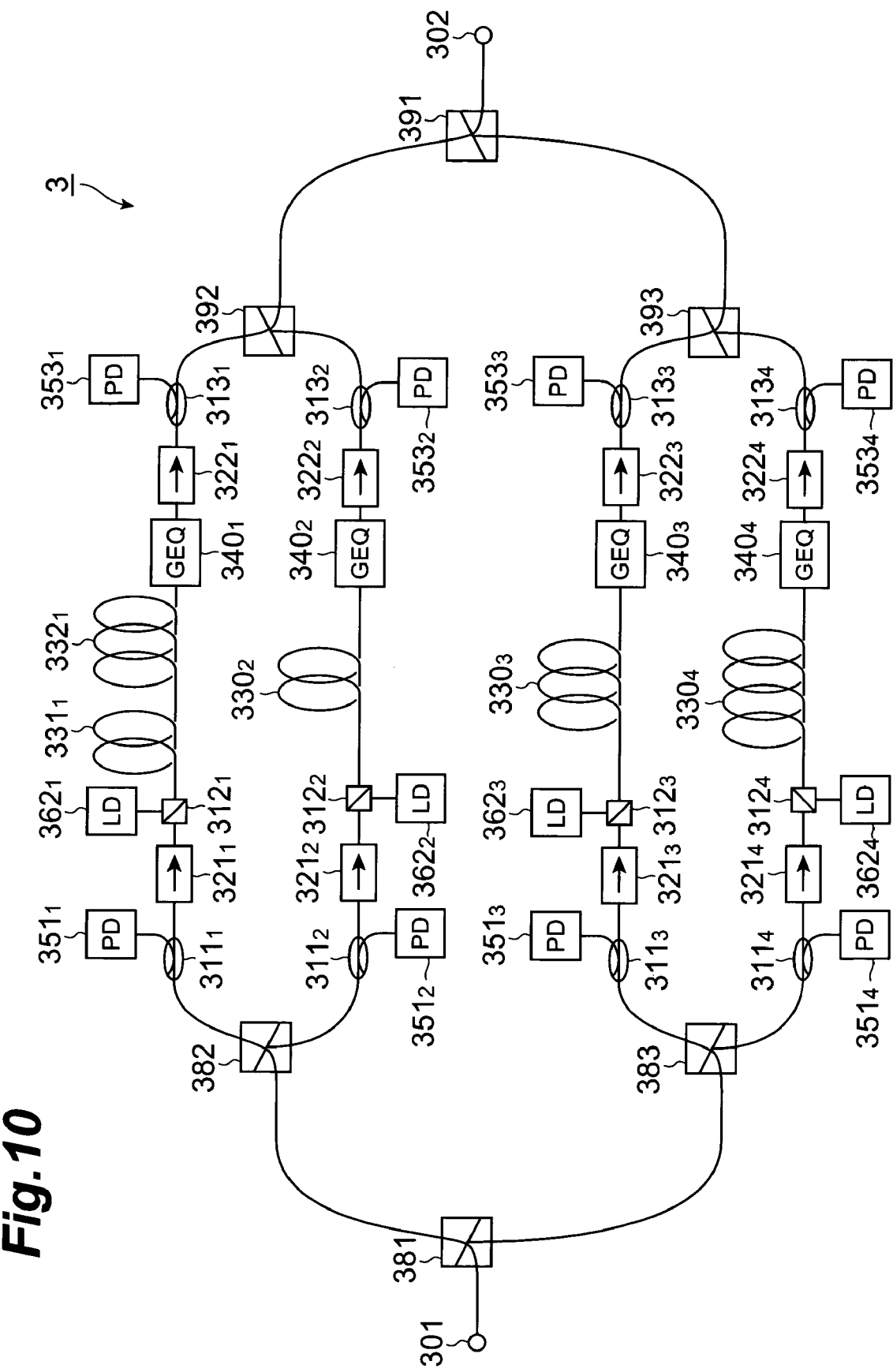
FIG. 10 is a diagram showing an optical amplifier module 3 in accordance with a third embodiment of the present invention.

FIG. 10 is a diagram showing an optical amplifier module 3 in accordance with a third embodiment. The optical amplifier module 3 shown in this drawing comprises four signal light propagation lines disposed in parallel between optical dividing means (optical demultiplexers 381 to 383) on the optical input end 301 side and optical combining means (optical multiplexers 391 to 393) on the optical output end 302 side.

The optical amplifier module 3 comprises, successively on the first signal light propagation line from the optical demultiplexer 382 to the optical multiplexer 392, an optical coupler $311_1$, an optical isolator $321_1$, an optical coupler $312_1$, optical amplifier fibers $331_1$, $332_1$, a gain equalizer $340_1$, an optical isolator $322_1$, and an optical coupler $313_1$. The optical amplifier module 3 comprises, successively on the second signal light propagation line from the optical demultiplexer 382 to the optical multiplexer 392, an optical coupler $311_2$, an optical isolator $321_2$, an optical coupler $312_2$, an optical amplifier fiber $330_2$, a gain equalizer. $340_2$, an optical isolator $322_2$, and an optical coupler $313_2$. The optical amplifier module 3 comprises, successively on the third signal light propagation line from the optical demultiplexer 383 to the optical multiplexer 393, an optical coupler $311_3$, an optical isolator $321_3$, an optical coupler $312_3$, an optical amplifier fiber $330_3$, a gain equalizer $340_3$, an optical isolator $322_3$, and an optical coupler $313_3$. The optical amplifier module 3 comprises, successively on the fourth signal light propagation line from the optical demultiplexer 383 to the optical multiplexer 393, an optical coupler $311_4$, an optical isolator $321_4$, an optical coupler $312_4$, an optical amplifier fiber $330_4$, a gain equalizer $340_4$, an optical isolator $322_4$, and an optical coupler $313_4$.

The optical amplifier module 3 further comprises a photodiode $351_1$, connected to the optical coupler $311_1$, a laser diode $362_1$, connected to the optical coupler $312_1$, a photodiode $353_1$, connected to the optical coupler $313_1$, a photodiode $351_2$ connected to the optical coupler $311_2$, a laser diode $362_2$ connected to the optical coupler $312_2$, a photodiode $353_2$ connected to the optical coupler $313_2$, a photodiode $351_2$ connected to the optical coupler $311_3$, a laser diode $362_3$ connected to the optical coupler $312_3$, a photodiode $353_3$ connected to the optical coupler $313_3$, a photodiode $351_4$ connected to the optical coupler $311_4$, a laser diode $362_4$ connected to the optical coupler $312_4$, and a photodiode $353_4$ connected to the optical coupler $313_4$.

The optical demultiplexer 381 divides the signal light fed to the optical input end 301 into two wavelength regions, outputs one wavelength region of the signal light to the optical demultiplexer 382, and outputs the other wavelength region of the signal light to the optical demultiplexer 383. The optical demultiplexer 382 divides the signal light having arrived from the optical demultiplexer 381 into first and second wavelength regions, outputs the first wavelength region of signal light to the optical coupler $311_1$, on the first signal light propagation line, and outputs the second wavelength region of signal light to the optical coupler $311_2$ on the second signal light propagation line. The optical demultiplexer 383 divides the signal light having arrived from the optical demultiplexer 381 into third and fourth wavelength regions, outputs the third wavelength region of signal light to the optical coupler $311_3$ on the third signal light propagation line, and outputs the fourth wavelength region of signal light to the optical coupler $311_4$ on the fourth signal light propagation line. Namely, the optical dividing means constituted by the optical demultiplexers 381 to 383 divides the signal light fed to the optical input end 301 into four wavelength regions.

The optical multiplexer 392 inputs the first wavelength region of signal light having arrived from the optical coupler $313_1$, on the first signal light propagation line and the second wavelength region of signal light having arrived from the optical coupler $313_2$ on the second signal light propagation line, combines them, and outputs thus combined signal light to the optical multiplexer 391. The optical multiplexer 393 inputs the first wavelength region of signal light having arrived from the optical coupler $313_3$ on the third signal light propagation line and the fourth wavelength region of signal light having arrived from the optical coupler $313_4$ on the fourth signal light propagation line, combines them, and outputs thus combined signal light to the optical multiplexer 391. The optical multiplexer 391 inputs the first and second wavelength regions of signal light having arrived from the optical multiplexer 392 and the third and fourth wavelength regions of signal light having arrived from the optical multiplexer 393, combines these four wavelength regions of signal light, and outputs thus combined signal light from the output end 302.

The other constituents included in the optical module 3 in accordance with the third embodiment have functions similar to those of the constituents having the same names included in the optical module 1 in accordance with the first embodiment. The optical amplifier fibers $331_1$, $332_2$ are made of any of the above-mentioned fluorescent glass samples, and can guide pumping light and signal light while being able to optically amplify the signal light when supplied with the pumping light. The optical amplifier fibers $331_1$, $332_2$ have respective compositions different from each other and are optically cascaded to each other on the first signal light propagation line.

Each of the optical amplifier fibers $330_2$ to $330_4$ is made of fluorescent glass, and can guide pumping light and signal light while being able to optically amplify the signal light when supplied with the pumping light. The optical amplifier fibers $331_1$, $332_1$, have gains greater in the first wavelength region. The optical amplifier fiber $330_2$ has a gain greater in the second wavelength region. The optical amplifier fiber $330_3$ has a gain greater in the third wavelength region. The optical amplifier fiber $330_4$ has a gain greater in the fourth wavelength region.

In the optical amplifier module 3, the pumping light outputted from the laser diode $362_1$, acting as a pumping light source is forwardly supplied to the optical amplifier fibers $331_1$, $332_1$, by way of the optical coupler $312_1$. The pumping light outputted from the laser diode $362_2$ acting as a pumping light source is forwardly supplied to the optical amplifier fiber $330_2$ by way of the optical coupler $312_2$. The pumping light outputted from the laser diode $362_3$ acting as a pumping light source is forwardly supplied to the optical amplifier fiber $330_3$ by way of the optical coupler $312_3$. The pumping light outputted from the laser diode $362_4$ acting as a pumping light source is forwardly supplied to the optical amplifier fiber $330_4$ by way of the optical coupler $312_4$.

The signal light fed to the optical input end 301 is divided into first to fourth wavelength regions by the optical demultiplexers 381 to 383. The first wavelength region of signal light is outputted to the optical coupler $311_1$, on the first signal light line. The second wavelength region of signal light is outputted to the optical coupler $311_2$ on the second signal light line. The third wavelength region of signal light is outputted to the optical coupler $311_3$ on the third signal light line. The fourth wavelength region of signal light is outputted to the optical coupler $311_4$ on the fourth signal light line.

The first wavelength region of signal light outputted to the optical coupler $311_1$, on the first signal light line from the optical demultiplexer 382 travels the optical coupler $311_1$, optical isolator $321_1$, and optical coupler $312_1$, and then is optically amplified in the optical amplifier fibers $331_1$, $332_1$. With the gain equalized by the gain equalizer $340_1$, the amplified signal light reaches the optical multiplexer 392 by way of the optical isolator $322_1$, and optical coupler $313_1$. The second wavelength region of signal light outputted to the optical coupler $311_2$ on the second signal light line from the optical demultiplexer 382 travels the optical coupler $311_2$, optical isolator $321_2$, and optical coupler $312_2$, and then is optically amplified in the optical amplifier fiber $330_2$. With the gain equalized by the gain equalizer $340_2$, the amplified signal light reaches the optical multiplexer 392 by way of the optical isolator $322_2$ and optical coupler $313_2$.

The third wavelength region of signal light outputted to the optical coupler $311_3$ on the third signal light line from the optical demultiplexer 383 travels the optical coupler $311_3$, optical isolator $321_3$, and optical coupler $312_3$, and then is optically amplified in the optical amplifier fiber $330_3$. With the gain equalized by the gain equalizer $340_3$, the amplified signal light reaches the optical multiplexer 393 by way of the optical isolator $322_3$ and optical coupler $313_3$. The fourth wavelength region of signal light outputted to the optical coupler $311_4$ on the fourth signal light line from the optical demultiplexer 383 travels the optical coupler $311_4$, optical isolator $321_4$, and optical coupler $312_4$, and then is optically amplified in the optical amplifier fiber $330_4$. With the gain equalized by the gain equalizer $340_4$, the amplified signal light reaches the optical multiplexer 393 by way of the optical isolator $322_4$ and optical coupler $313_4$.

The first wavelength region of signal light having reached the optical multiplexer 392 from the optical coupler $313_1$, on the first signal light propagation line, the second wavelength region of signal light having reached the optical multiplexer 392 from the optical coupler $313_2$ on the second signal light propagation line, the third wavelength region of signal light having reached the optical multiplexer 393 from the optical coupler $313_3$ on the third signal light propagation line, and the fourth wavelength region of signal light having reached the optical multiplexer 393 from the optical coupler $313_4$ on the fourth signal light propagation line are combined by the optical multiplexers 391 to 393, and thus combined signal light is outputted from the optical output end 302.

Part of the first wavelength region of signal light fed to the optical input end 301 is branched out by the optical coupler $311_1$, and the power thereof is monitored by the photodiode $351_1$. Part of the second wavelength region of signal light fed to the optical input end 301 is branched out by the optical coupler $311_2$, and the power thereof is monitored by the photodiode $351_2$. Part of the third wavelength region of signal light fed to the optical input end 301 is branched out by the optical coupler $311_3$, and the power thereof is monitored by the photodiode $351_2$. Part of the fourth wavelength region of signal light fed to the optical input end 301 is branched out by the optical coupler $311_4$, and the power thereof is monitored by the photodiode $351_4$.

Part of the first wavelength region of signal light outputted from the optical output end 302 is branched out by the optical coupler $313_1$, and the power thereof is monitored by the photodiode $353_1$. Part of the second wavelength region of signal light outputted from the optical output end 302 is branched out by the optical coupler $313_2$, and the power thereof is monitored by the photodiode $353_2$. Part of the third wavelength region of signal light outputted from the optical output end 302 is branched out by the optical coupler $313_3$, and the power thereof is monitored by the photodiode $353_3$. Part of the fourth wavelength region of signal light outputted from the optical output end 302 is branched out by the optical coupler $313_4$, and the power thereof is monitored by the photodiode $353_4$.

The overall gain spectrum of the optical amplifier module 3 is the sum of the respective gain spectra of the optical amplifier fibers $331_1$, $332_1$, and the loss spectrum of the gain equalizer $340_1$, in the first wavelength region, the sum of the gain spectrum of the optical amplifier fiber $330_2$ and the loss spectrum of the gain equalizer $340_2$ in the second wavelength region, the sum of the gain spectrum of the optical amplifier fiber $330_3$ and the loss spectrum of the gain equalizer $340_3$ in the third wavelength region, and the sum of the gain spectrum of the optical amplifier fiber $330_4$ and the loss spectrum of the gain equalizer $340_4$ in the fourth wavelength region.

Since the optical amplifier fibers $331_1$, $332_1$, $330_2$, $330_3$, and $330_4$ comprise respective fluorescent glass compositions different from each other and have respective gain bands different from each other, the optical amplifier module 3 can attain a gain over a wide band as a whole. For example, the optical amplifier fiber $331_1$, is made of the fluorescent glass sample A having a fluorescence peak near a wavelength of 1.24 μm, whereas the optical amplifier fiber $332_1$, is made of the fluorescent glass sample C having a fluorescence peak near a wavelength of 1.41 μm. In this case, when supplied with pumping light in the wavelength band of 0.8 μm from the laser diode $362_1$, the optical amplifier fibers $331_1$, $332_1$, can optically amplify signal light in O and E bands as the first wavelength region. The optical amplifier fiber $330_2$ is made of fluorescent glass doped with Tm element, and can optically amplify signal light in S band as the second wavelength region when supplied with pumping light in the wavelength band of 1.05 μm from the laser diode $362_2$. The optical amplifier fiber $330_3$ is made of fluorescent glass doped with Er element, and can optically amplify signal light in C band as the third wavelength region when supplied with pumping light in the wavelength band of 1.48 μm from the laser diode $362_3$. The optical amplifier fiber $330_4$ is made of fluorescent glass doped with Er element, and can optically amplify signal light in L band as the fourth wavelength region when supplied with pumping light in the wavelength band of 1.48 μm from the laser diode $362_4$. In this case, the optical amplifier module 3 can attain a gain spectrum in a wide band (with a total bandwidth of about 310 nm) over O, E, S, C, and L bands.

Without being restricted to the above-mentioned embodiments, the present invention can be modified in various manners. For example, though each of the optical amplifier modules in accordance with the above-mentioned embodiments comprises an optical amplifier fiber as an optical amplifier medium, it may be an optical waveguide made of fluorescent glass formed on a flat substrate. However, the optical amplifier fiber is advantageous over the flat optical waveguide in that it can easily elongate the optical amplifier operation length and in that it yields lower loss when connecting with other fibers or other optical components (e.g., optical isolators and optical couplers).

Preferably, the optical amplifier module comprises a dispersion compensator for compensating for the dispersion of optical transmission lines of optical communication systems. For example, it will be preferred if the optical amplifier module 1 in accordance with the first embodiment comprises a dispersion adjusting device between the optical amplifier fibers 131 and 132, and if the optical amplifier module 3 in accordance with the third embodiment comprises a dispersion adjusting device between the optical amplifier fibers $331_1$, and $332_1$. Preferably, in the optical amplifier module 2 in accordance with the second embodiment, the optical amplifier fiber $230_1$, has a multistage configuration with a dispersion adjusting device for compensating for the dispersion in the first wavelength region provided between stages, and the optical amplifier fiber $230_2$ has a multistage configuration with a dispersion adjusting device for compensating for the dispersion in the second wavelength region provided between stages. The same holds in the optical amplifier module 3 in accordance with the third embodiment.

Though the above-mentioned embodiments relate to fluorescent glass containing Bi ions as a dopant, the present invention is also applicable to a fluorescent crystal or fluorescent glass ceramic. Namely, the fluorescent crystal or fluorescent glass ceramic in accordance with the present invention contains a codopant other than $Al_2O_3$ in a region containing a Bi ion as a dopant. They can attain a fluorescence stronger than that of the fluorescent glass.

The fluorescent glass in accordance with the present invention contains at least 50 mol % of at least one kind of oxide selected from the group consisting of $SiO_2$, $GeO_2$, and $P_2O_5$ as a glass constituent, and a Bi ion as a dopant; exhibits a fluorescent property over a wide range exceeding 100 nm; and is easy to make since its melting point is low.

What is claimed is:

1. Fluorescent glass containing 50 mol % of an oxide selected from the group consisting of $SiO_2$, $GeO_2$, and $P_2O_5$ as a host glass constituent of a region containing a Bi ion as a fluorescent dopant.

2. Fluorescent glass according to claim 1, further containing an oxide selected from the group consisting of BaO, CaO, $Na_2O$, $B_2O_3$, $Ga_2O_3$, $Ta_2O_5$, and $Nb_2O_5$ as a glass constituent.

3. Fluorescent glass according to claim 2, further containing an oxide of an element adapted to become a trivalent positive ion as a codopant.

4. Fluorescent glass according to claim 3, containing $Al_2O_3$ as the codopant.

5. Fluorescent glass according to claim 4, wherein $Al_2O_3$ contained therein as the codopant has a concentration of at least 5 mol %.

6. Fluorescent glass according to claim 2, containing $B_2O_3$ without containing $Al_2O_3$ as a codopant.

7. Fluorescent glass according to claim 6, containing $Ta_2O5$ as a codopant.

8. Fluorescent glass according to claim 1, exhibiting a fluorescence peak wavelength exceeding 1300 nm.

9. Fluorescent glass according to claim 1, exhibiting a fluorescence peak wavelength exceeding 1400 nm.

10. Fluorescent glass according to claim 1, exhibiting a B value of 0.3 or less as an index of alkalinity.

11. Fluorescent glass according to claim 10, further containing an oxide of an element adapted to become a trivalent positive ion as a codopant.

12. An optical amplifier waveguide comprising the fluorescent glass according to claim 1; the optical amplifier waveguide being adapted to guide pumping light and signal light, and optically amplify the signal light when supplied with the pumping light.

13. An optical amplifier module comprising:
   the optical amplifier waveguide according to claim 12; and
   pumping light supply means for supplying the amplifier waveguide with the pumping light.

14. An optical amplifier module according to claim 13, wherein the pumping light has a center wavelength longer than 800 nm.

15. An optical amplifier module comprising:
   first and second optical amplifier waveguides, cascaded to each other on a signal light propagation line, having respective compositions different from each other, each being the optical amplifier waveguide according to claim 12;
   first pumping light supply means for supplying the first optical amplifier waveguide with pumping light; and
   second pumping light supply means for supplying the second optical amplifier waveguide with pumping light.

16. An optical amplifier module according to claim 15, wherein the first optical amplifier waveguide contains $Al_2O_3$;

wherein the second optical amplifier waveguide contains a codopant other than $Al_2O_3$; and wherein the first and second optical amplifier waveguides have respective fluorescence peak wavelengths separated from each other by at least 70 nm.

17. An optical amplifier module comprising:

first and second optical amplifier waveguides having respective compositions different from each other, each being the optical amplifier waveguide according to claim 12;

first pumping light supply means for supplying the first optical amplifier waveguide with pumping light;

second pumping light supply means for supplying the second optical amplifier waveguide with pumping light;

optical dividing means for dividing input signal light into first and second wavelength regions, outputting the first wavelength region of signal light to the first optical amplifier waveguide, and outputting the second wavelength region of signal light to the second optical amplifier waveguide; and optical combining means for combining the first wavelength region of signal light outputted from the first optical amplifier waveguide after being optically amplified thereby and the second waveguide of signal light outputted from the second optical amplifier waveguide after being optically amplified thereby, and outputting thus combined signal light.

* * * * *